United States Patent [19]
Lehman et al.

[11] Patent Number: 5,515,182
[45] Date of Patent: May 7, 1996

[54] ROTARY SCANNER

[75] Inventors: Richard F. Lehman, Nashua; Richard A. Williams, Hampstead, both of N.H.; Robert Howard, New York, N.Y.; Michael Varanka, Amherst; Mark W. Magee, Derry, both of N.H.

[73] Assignee: Howtek, Inc., Hudson, N.H.

[21] Appl. No.: 940,244

[22] Filed: Aug. 31, 1992

[51] Int. Cl.$^6$ ............................ G03F 9/00; H04N 1/00
[52] U.S. Cl. ............................................................ 358/493
[58] Field of Search ................................... 358/298, 290, 358/289, 292, 285, 264, 293, 282, 256, 80, 76, 489, 474, 287, 49, 296; 250/236, 234; 403/24, 31, 322, 330; 355/211, 200, 213, 60, 210, 260, 245

[56] References Cited

U.S. PATENT DOCUMENTS

| | | | |
|---|---|---|---|
| Re. 33,784 | 12/1991 | Osawa et al. | 360/85 |
| 3,925,607 | 12/1975 | Hauber | 178/7.1 |
| 3,938,191 | 2/1976 | Jarmy . | |
| 3,975,761 | 8/1976 | Taudt et al. | 358/524 |
| 3,997,828 | 12/1976 | Bottcher et al. | 318/603 |
| 4,004,079 | 1/1977 | Boston | 358/456 |
| 4,057,838 | 11/1977 | Doelves et al. | 358/299 |
| 4,093,964 | 6/1978 | Aughton | 358/302 |
| 4,110,796 | 8/1978 | Aughton | 358/298 |
| 4,120,045 | 10/1978 | Moellgaard et al. | 364/470 |
| 4,127,870 | 11/1978 | Colditz | 358/502 |
| 4,135,212 | 1/1979 | Pugsley et al. | 358/462 |
| 4,149,195 | 4/1979 | Gast | 358/482 |
| 4,173,416 | 11/1979 | Pugsley et al. | 356/432 |
| 4,189,741 | 2/1980 | Klopsch | 358/518 |
| 4,189,742 | 2/1980 | Klopsch | 358/518 |
| 4,194,839 | 3/1980 | Knop | 358/515 |
| 4,199,784 | 4/1980 | Wellendorf et al. | 358/296 |
| 4,206,475 | 6/1980 | Taudt et al. | 358/530 |
| 4,206,482 | 6/1980 | D. DeLavalette et al. | 358/290 |
| 4,232,343 | 11/1980 | Sommer | 358/296 |
| 4,240,117 | 12/1980 | Wellendorf et al. | 358/296 |
| 4,240,118 | 12/1980 | Wellendorf et al. | 358/296 |
| 4,245,260 | 1/1981 | Doelves | 358/299 |
| 4,255,761 | 3/1981 | Knop et al. | 358/521 |
| 4,257,070 | 3/1981 | Sommer et al. | 358/455 |
| 4,276,567 | 6/1981 | Wellendorf et al. | 358/456 |
| 4,315,285 | 2/1982 | Sommer et al. | 358/455 |
| 4,346,402 | 8/1982 | Pugsley | 358/523 |
| 4,349,279 | 9/1982 | Jung | 358/520 |
| 4,350,996 | 9/1982 | Rosenfeld | 358/536 |
| 4,363,037 | 12/1982 | Taudt | 358/296 |
| 4,393,399 | 7/1983 | Gast et al. | 358/531 |
| 4,404,596 | 9/1983 | Juergensen et al. | 358/481 |
| 4,413,286 | 11/1983 | Boston | 358/298 |
| 4,433,912 | 2/1984 | Schwartz | 356/150 |
| 4,453,180 | 6/1984 | Juergensen | 358/510 |
| 4,456,924 | 6/1984 | Rosenfeld | 358/536 |
| 4,473,848 | 9/1984 | Juergensen | 358/484 |

(List continued on next page.)

FOREIGN PATENT DOCUMENTS

| | | |
|---|---|---|
| 0483827 | 6/1992 | European Pat. Off. . |
| 3831532 | 4/1989 | Germany . |
| 2168170 | 6/1986 | United Kingdom . |

*Primary Examiner*—Paul Ip
*Attorney, Agent, or Firm*—Cesari and McKenna

[57] ABSTRACT

A high quality, relatively inexpensive rotary scanner provides both transmission and reflection scanning of documents mounted on a rotary drum. The drum translates with respect to an imaging lens located adjacent the drum and on the exterior thereof. A first illuminating element surrounding the imaging lens illuminates the document on the drum for reflection scanning; a second illuminating element mounted on a cantilevered arm extending along the axis of the drum illuminates the document for transmission scanning. Focusing of the image is performed either automatically or under the control of the user. A high resolution and wide dynamic range is provided by a set of photomultiplier tubes which receive light from the imaging lens by way of an aperture wheel which provides apertures of selectable size in accordance with the desired resolution. User replaceable lamp modules allow the precise positioning of high intensity replacement lamps without need for a technician.

42 Claims, 7 Drawing Sheets

U.S. PATENT DOCUMENTS

| | | | |
|---|---|---|---|
| 4,479,147 | 10/1984 | Rossini | 358/493 |
| 4,479,148 | 10/1984 | Sheck et al. | 358/491 |
| 4,488,716 | 12/1984 | Sheck | 271/3 |
| 4,488,717 | 12/1984 | Sheck | 414/222 |
| 4,490,608 | 12/1984 | Yeadon et al. | 358/425 |
| 4,492,984 | 1/1985 | Dinse et al. | 358/492 |
| 4,498,108 | 2/1985 | Lindemann et al. | 358/459 |
| 4,499,489 | 2/1985 | Gall et al. | 358/536 |
| 4,501,467 | 2/1985 | Crane et al. | 359/200 |
| 4,511,205 | 4/1985 | Crane | 359/200 |
| 4,516,023 | 5/1985 | Morrill et al. | 359/205 |
| 4,516,175 | 5/1985 | Jung et al. | 358/454 |
| 4,517,638 | 5/1985 | Provisor et al. | 358/491 |
| 4,549,067 | 10/1985 | Beisswenger et al. | 219/121.2 |
| 4,568,984 | 2/1986 | Juergensen et al. | 358/293 |
| 4,616,266 | 10/1986 | Hennig | 358/454 |
| 4,622,591 | 11/1986 | Katsuyama et al. | 358/289 |
| 4,623,692 | 11/1986 | Hansen | 524/549 |
| 4,628,350 | 12/1986 | Aughton et al. | 358/532 |
| 4,654,526 | 3/1987 | Nakaji | 358/289 |
| 4,660,975 | 4/1987 | Aughton | 356/308 |
| 4,668,979 | 5/1987 | Jung | 358/515 |
| 4,688,101 | 8/1987 | Doelves et al. | 358/299 |
| 4,698,515 | 10/1987 | Sepai | 358/482 |
| 4,700,235 | 10/1987 | Gall | 358/459 |
| 4,719,474 | 1/1988 | Hansen et al. | 359/216 |
| 4,719,506 | 1/1988 | Van Buren | 358/80 |
| 4,724,477 | 2/1988 | Ellis et al. | 358/532 |
| 4,724,489 | 2/1988 | Oldershaw | 358/483 |
| 4,725,966 | 7/1988 | Darby et al. | 358/448 |
| 4,736,099 | 4/1988 | Zelenka | 355/67 |
| 4,754,153 | 6/1988 | Hicks | 348/316 |
| 4,758,068 | 7/1988 | Aughton et al. | 369/100 |
| 4,770,896 | 9/1988 | Crown et al. | 427/461 |
| 4,771,339 | 9/1988 | Clinton | 358/296 |
| 4,792,816 | 12/1988 | Kennedy, Jr. | 318/685 |
| 4,794,805 | 1/1989 | Carney et al. | 73/862.452 |
| 4,803,497 | 2/1989 | Kennedy, Jr. et al. | 358/300 |
| 4,812,913 | 3/1989 | Knop et al. | 358/474 |
| 4,821,114 | 4/1989 | Gebhardt | 358/512 |
| 4,834,520 | 5/1989 | Klainman | 359/509 |
| 4,853,709 | 8/1989 | Stein et al. | 346/108 |
| 4,870,504 | 9/1989 | Ishida et al. | 358/489 |
| 4,897,737 | 1/1990 | Shalev | 358/489 |
| 4,902,156 | 2/1990 | Deisler et al. | 358/49 |
| 4,907,077 | 3/1990 | Schulz-Hennig et al. | 358/516 |
| 4,922,297 | 5/1990 | Kondo | 355/211 |
| 4,989,096 | 1/1991 | Webb et al. | 358/298 |
| 4,992,804 | 2/1991 | Roe | 358/298 |
| 4,992,862 | 2/1991 | Gabor | 358/518 |
| 4,992,890 | 2/1991 | Pinard et al. | 358/474 |
| 5,168,288 | 12/1992 | Back et al. | 346/76 L |
| 5,266,998 | 11/1993 | Lee | 355/210 |

ROTARY SCANNER

BACKGROUND OF THE INVENTION

A. Field of the Invention

The invention relates to scanners for providing a digitized image of a document and, more particularly, to a high quality but inexpensive rotary scanner.

B. Prior Art

Scanners are increasingly utilized for digitizing both materials such as letters, memoranda, photographs, or the like, as well as transparencies; for ease of reference, these will all be referred to hereinafter simply as "documents" or "a document".

There are two principal types of scanners, namely, flat bed scanners and rotary scanners. Flat bed scanners mount the document on a flat surface or "bed" and scan the document from side to side and line by line to form the desired image which is then in a form suitable for high speed processing. The scanning apparatus in flat bed scanners is often complex and requires careful adjustment in order to maintain image quality. Further, the scanning resolution is often limited both in resolution and in dynamic range by the nature of the linear array used for detection, and thus scanners of this type are found most often in the "low end" price range of scanners.

Rotary scanners, in contrast, mount the document on a drum and provision is made for relative motion between the drum and a scanning head which forms the digitized image. Because the relative motion is primarily rotational in nature, high scanning rates can be achieved, and systems of this type are commonly used in commercial operations. However, they are generally much more expensive than flat bed scanners, and this has restricted their use.

Quality scanners typically use high intensity light sources to illuminate the source being scanned. These light sources generally have a relatively short life, and thus require frequent replacement. Because the alignment of the light source within the optical system frequently is critical, the replacement is generally performed by a trained technician from the scanner manufacturer, and this increases the cost of maintenance of the system.

In order to efficiently collect light reflected from, or transmitted through, a document, a lens of high numerical aperture is desirable. However, such lenses have a very narrow depth of focus, and the common variation of document thickness from source to source can cause unacceptable variations in focus.

OBJECTS OF THE INVENTION

A. Objects

Accordingly, it is an object of the invention to provide an improved rotary scanner.

Further, it is an object of the invention to provide an improved rotary scanner that is of lesser cost than scanners of comparable capability and reliability.

Yet a further object of the invention is to provide an improved rotary scanner having a user-replaceable light source.

Still a further object of the invention is to provide a means for quickly and reliably setting a desired focus for images sources to be scanned.

Another object of the invention is to provide a rotary scanner of moderate cost yet having high resolution and wide dynamic range.

B. Brief Description of the Invention

In accordance with the present invention, a rotary scanner is formed from a rotating and translating drum on which the document to be scanned is mounted, and a fixed bed on which the optical illumination and scanning system is mounted. The drum is cylindrical in nature, and translucent, and thus accommodates both reflective and translucent documents. The drum is rotatable at varying speeds in order to accommodate the maximum data rate of the system.

The drum is mounted on a segmented carriage which traverses a fixed bed forming the frame of the scanner. The carriage is mounted on ways fixed to the bed, and is driven by a stepper motor to accomplish line advancement at a selected rate. The two segments of the carriage are coupled by taut springs which are separable by a cam to allow mounting and dismounting of the drum. When the drum is mounted, one end of the drum is held in a collar mounted in a free-wheeling bearing race; the other end is held in a collar driven by a motor which rotates the drum at a selected rate. A shaft encoder is coupled to the drum drive to provide an indication of the instantaneous position of the drum.

Adjacent the outer surface of the drum and fixedly mounted on the frame of the scanner is an optical subsystem which images the object to be scanned. The subsystem includes an analyzer lens of high numerical aperture (e.g., 0.3) and moderate magnification (e.g. 10×) which images the source onto an aperture wheel having a number of circumferentially spaced, generally square apertures extending around the periphery thereof and forming field stops for the imaging system. Preferably, the stops range in size from 62.5 microns in width (corresponding to a resolution of 4000 dots per inch (dpi) to 2500 microns (corresponding to a resolution of 100 dpi). The desired field stop is rotated into the optical path by means of a stepper motor in response to operator selection.

The output of the analyzer lens is transmitted to a plurality of photodetectors by means of a relay lens. This ensures that the image size on the detectors is independent of the size of the field stop. In accordance with the present invention, the photodetectors comprise photomultiplier tubes that provide a generally linear response to incident light over a dynamic range corresponding to at least the minimum dynamic range for linear operation of the system. In the present embodiment, a range on the order of a minimum of 4000:1 for linear operation of the system, and up to 10,000:1 for log mode operation has been attained.

The photomultiplier tubes are mounted on a base, together with a plurality of beam splitters and optical filters. In particular, a first beam splitter in the nature of a dichroic filter is positioned at a forty five degree angle to the optical path of the light transmitted through the field stops of the aperture wheel. This beam splitter transmits a selected spectral portion of the incident light (e.g., that portion corresponding to the color red) to a first photomultiplier tube, and reflects the remainder to a second dichroic filter beam splitter. The second beam splitter, in line with the first such beam splitter and also disposed at an angle of forty five degrees to the optical path of light from the selected field stop, similarly receives light reflected from the first beam splitter and reflects a selected spectral portion of the incident light (e.g., that portion corresponding to the color blue) onto a second photomultiplier tube; it transmits the rest (which corresponds to the remaining primary spectral color, e.g., green) to a third photomultiplier tube. Respective exclusion filters positioned in front of each of the tubes filter all but light of the respective selected colors to provide further color discrimination between the photomultiplier tubes.

Located in the optical path between the analyzer lens and the aperture wheel is a pivotally mounted viewing mirror which is rotatable between a first position in which the mirror clears the optical path so that light traveling the path does not impinge upon the mirror, and a second position in which the light from the analyzer lens is interrupted and reflected upwardly to a viewing screen. This allows the user to focus the analyzer lens to thereby adjust for variations in the thickness of the document or to obtain special effects (such as a slight defocus to soften the image).

Provision is made for either manual or automatic focus of the analyzer lens. To this end, the lens is mounted on a movable carriage, together with the viewing mirror. The carriage is driven from a motor which translates the lens toward and away from the drum surface in accordance with control inputs applied to the motor. These control inputs may originate from stepping signals generated by the operator by depressing a focus control button or may be generated by the system itself in accordance with measurement of the light received from a document to be scanned. In the specific embodiment of the scanner described herein, the focus control button is located on the scanner itself, but the focusing can also be accomplished remotely from a computer terminal or the like.

Surrounding the analyzer lens is a reflection illuminator. The illuminator is removably secured to the housing of the analyzer lens and moves with it as the lens is focused. Thus, the state of the illumination does not change as the focus is changed.

Transmissive scanning is accomplished by means of a cantilevered arm which extends from one end of the frame along the axis of the drum. The free end of the arm carries a housing containing a transmissive illuminating lens for imaging a remote light source (described in more detail below) onto the outer surface of the drum for scanning transparent documents (referred to hereinafter as the transmission mode of scanning). The lens is mounted for adjustment both transversely with respect to its optical axis to enable alignment of its optical axis with that of the analyzer lens, as well as along its optical axis to enable focusing of its image on the at the same spot as that to which the analyzer lens is focused. In order to minimize the length of the scanner, when the drum is at its initial or "home" position, its leading edge is closely adjacent the position of the transmissive illuminating lens so that scanning of documents mounted on the drum may begin with minimal initial "wasted" travel of the drum. As the drum advances along the bed, it encompasses and encloses an increasing portion of the cantilevered arm, and the lens mounted on the free end of the arm thereby effectively advances relative to the drum for line-by-line scanning.

In accordance with the present invention, the transmissive illuminating lens has a numerical aperture smaller than that of the analyzer lens, e.g., an aperture of 0.2, and a smaller magnification, e.g., 7×. As a result of the smaller aperture, the image of the transmissive illuminator lens will remain within the field of view of the analyzer lens despite some misalignment between the optical axes of the transmissive lens and the analyzer lens.

A pair of high intensity lamps provide the illuminating light for operation in the reflective and the transmissive modes, respectively. These lamps are mounted on a block removably secured to the fixed optical bed. The mounting block has locating holes which mate with corresponding alignment pins on the optical bed to precisely align the block with respect to the bed. The block is secured to the bed by means of a pair of snap fasteners which allow ready disengagement when the block is to be removed, but which otherwise firmly secure the block to the bed.

The block itself carries a vertically extending plate having an opening formed therein through which a lamp such as a high intensity tungsten lamp projects illuminating light. In the embodiment of the invention described herein, the plate itself is alignable with respect to the base. This alignment is performed at the factory after the lamp is seated on the plate. Once a lamp and its associated plate are aligned with respect to a block in one scanner, they are effectively aligned with respect to all scanners, since the blocks are precision aligned by means of the locater holes fitting them to the alignment pins in the optical bed of the scanner. Accordingly, when a lamp is to be replaced, it is replaced as a unit with its mounting block and plate. This can be done by the user without further alignment, thus obviating the cost of a technical service call, as well as the attendant down time of the system.

There are two separate lamps in the system, one for reflection scanning, and one for transmission scanning. The lamps are identical, and thus wholly interchangeable. The light from these lamps is carried to the desired spot on the document by means of first and second fiber optic cables which provide the illumination for transmissive and reflective scanning, respectively.

A first (input) end of each cable is secured in a clamp opposite the respective lamp and is oriented at an angle to the optical axis of the lamp so the end of the cable "sees" the more uniformly illuminated reflector surrounding the central filament of the lamp. A second (output) end of the first cable terminates in a collar surrounding the analyzer lens. The collar provides a plurality of light paths oriented at forty five degrees to the axis of the associated lens and converging at the image plane of the lens in order to illuminate the image uniformly for reflective scanning. A second (output) end of the second cable terminates in a beam scrambler which provides a relatively uniform illumination over its face despite the possible presence of beam "hot spots" at its input. The scrambler directs the illuminating light onto a mirror and thence into an imaging lens which focuses the light onto the exterior surface of the drum. In accordance with the present invention, the scrambler comprises a flat glass plate whose surface is roughened to provide a more diffuse, and thus uniform, illumination over its surface.

An important factor in high resolution scanners (i.e., scanners whose resolution extends to thousands of dots per inch, as does the present scanner) is a stable, "jitter-free" or "noise-free" drive. Such a drive is achieved in the present invention by means of a "two-point" coupling between a driving plate and the scanner drum. The drum has an end cap in which is formed an elongated, radially-extending V-shaped groove. A pin having a curved end face is mounted on the drive plate and extends into this groove when the drum is mounted for scanning. The pin makes essentially a point contact with the opposite side walls of the groove for transmitting a driving force to the drum in the circumferential direction, and can slide upwardly and downwardly in the slot without substantial restraint to accommodate slight eccentricities in the drum or in the driving plate. A shaft also extends from the driving plate into a central hole in the drum. An O-ring on the shaft creates a force fit between the shaft and the side wall of the hole for centering the drum for rotation.

A composite strip is mounted on the drum surface in order to provide "black" and "white" references for scanning. The strip comprises an outer layer of highly reflective, "white" material such as a commercial base white as commonly used in photographic work; an intermediate layer of mylar having a full coat of solvent base black ink thereon; and a bottom layer of an adhesive for securely fastening the strip to the drum. The strip has a transmittance density greater than 6.0, and a diffuse reflectance density of approximately 0.06, and thus provides high quality black and white scanning references.

DETAILED DESCRIPTION OF THE INVENTION

The foregoing and other and further objects and features of the invention will be more readily understood from the following detailed description of the invention, when taken in conjunction with the accompanying drawings, in which.

Figure 1:
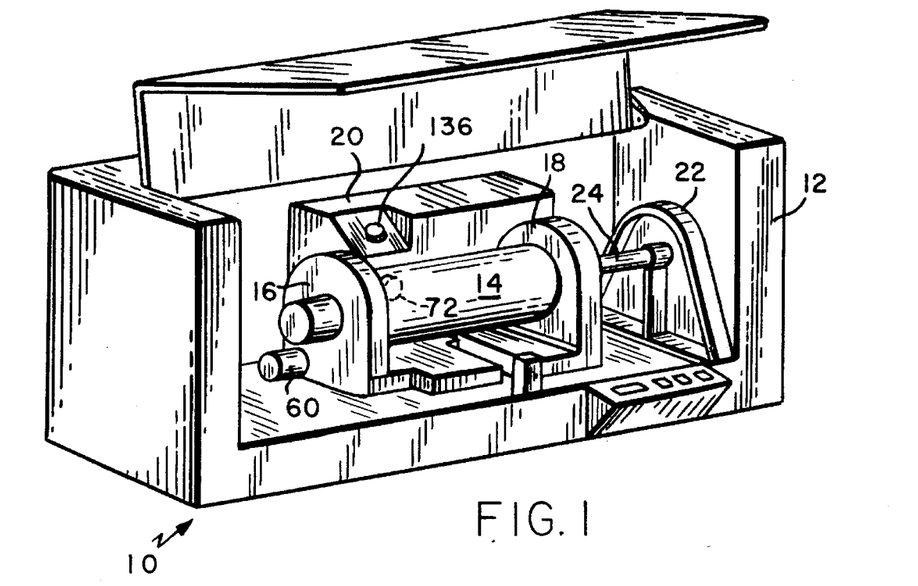
FIG. 1 is a view in perspective of the scanner of the present invention with the front cabinet door opened to expose principal portions of the scanner.

In FIG. 1, the scanner 10 of the present invention is formed from a cabinet 12 enclosing a drum 14 mounted for rotation in supports 16, 18. An optical subsystem 20 adjacent the drum scans a document (e.g., a memorandum, a photograph, a transparent slide, or the like) mounted on the drum. An exterior illuminator ring 72 illuminates a defined focal area on the surface of the drum for scanning reflective documents. An end support 22 carries a cantilever arm 24 which extends into the interior of the drum. As described below in more detail, the arm 24 carries a second source of illumination for scanning the drum from the interior thereof for transparent documents.

Figure 2:
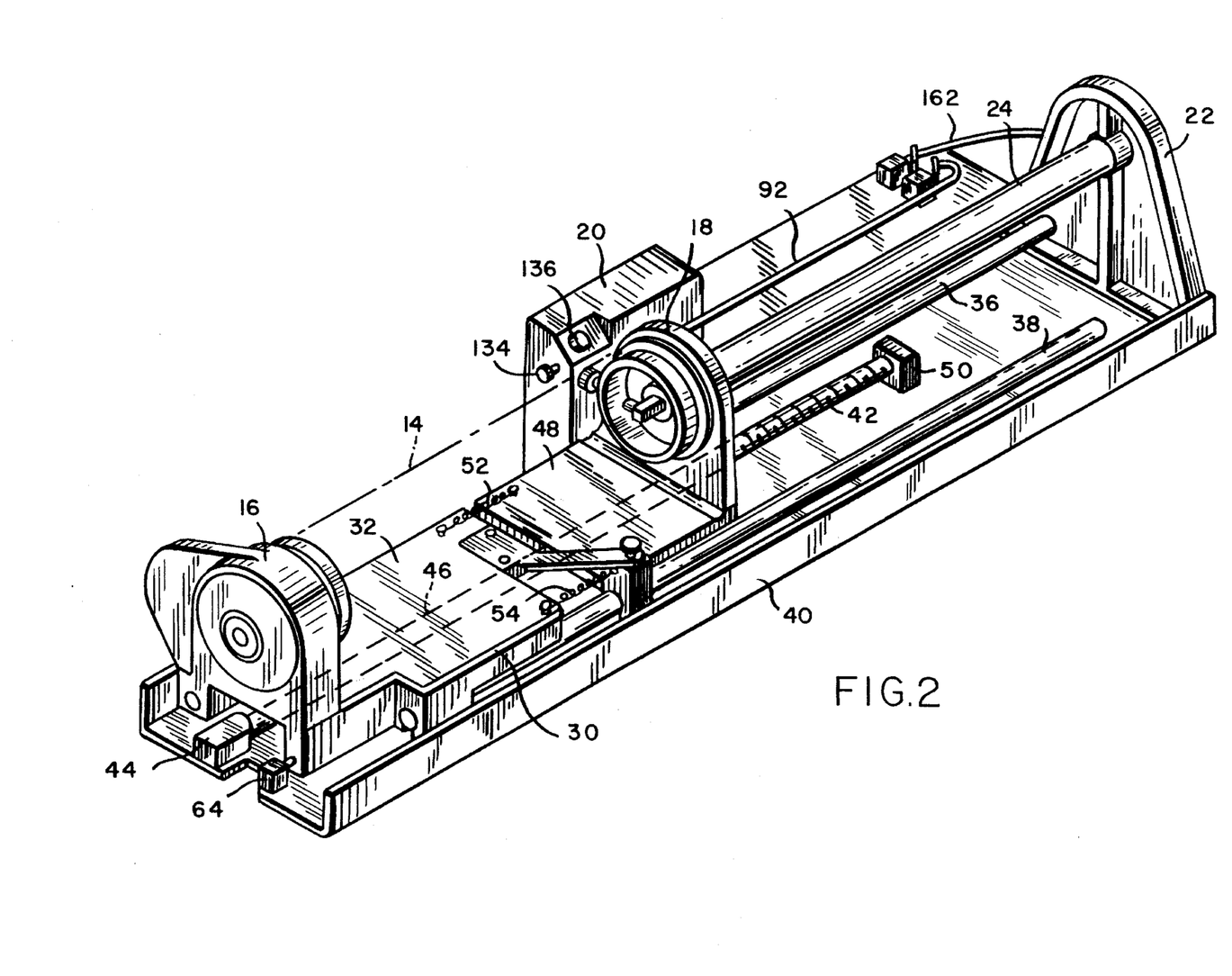
FIG. 2 is a view in perspective of the drum mount of the scanner of FIG. 1.

Turning now to FIG. 2, the drum and its mounting system are shown in more detail. Supports in the form of a head stock 16 and a tail stock 18 are mounted on a carriage 30 formed from separable carriage segments 32 and 34, respectively. These segments ride on ways 36, 38 which extend through them in a direction parallel to the longitudinal axis of the drum and which are fixed to a base 40. A screw thread 42 driven by a motor 44 extends through a longitudinal bore 46 in the carriage 32 into a threaded hole 48 in the carriage 34 and thence into a fixed nut 50. The carriage segments 32, 34 are connected by springs 52, 54. Accordingly, as motor 44 rotates, it rotates the screw 42 and thus drives carriage segment 34 longitudinally along the base. Carriage segment 32 is carried along with carriage segment 34 because of the spring connections between them, and thus the drum 14 mounted on the carriage is translated along the base 40 for scanning a document.

The drum 14 carrying a document to be scanned is mounted in, and demounted from, the scanner by separating the carriage segments 32, 34; mounting or demounting the drum, as the case may be, in the head stock 16 and tail stock 18; and thereafter closing the carriage segments. As shown more clearly in FIG. 2A, this is accomplished by means of a lever arm 56 which has a handle 58 at one end and a cam 60 at the other and which is pivotally mounted to carriage segment 32 by pivot 62. When the handle 58 is in its most counter-clockwise position as shown in FIG. 2, the two portions of the drum carriage are held closely together by the springs 52, 54 and the drum is securely mounted between the head stock 16 and tail stock 18. When, however, the handle 68 is rotated into its most clockwise position as shown in FIG. 2A, the rotation of the cam 70 about the pivot 62 separates the bases 32 and 34 from each other and allows removal or mounting of the drum 14.

Figure 2A:
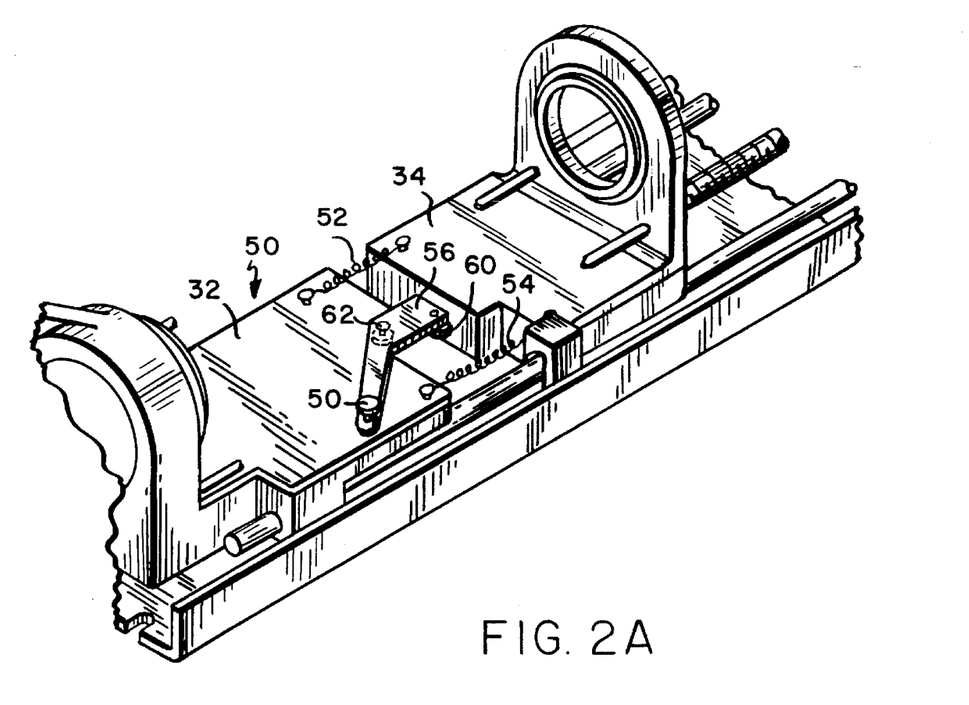
FIG. 2A is a view in perspective showing the drum carriage segments separated for mounting or demounting the drum.

As further detailed in FIG. 2A, two lateral holding pins or fingers 61A and 61B are located on a lower portion of the tail stock 18, with a finger 61 located on either side of the center of the tail stock 18. The fingers 61A and 61B extend inward from the tail stock 18 and longitudinally align with the carriage segments 32 and 34. A second pair of fingers 61C and 61D similarly extend inward from the head stock 16. (Finger 61D is shown in dashed lines as it is hidden in the view of FIG. 2A).

The fingers 61 facilitate both loading and unloading of the drum 14. This can be better understood by referring to FIG. 2B, which shows a drum 14 in the process of being loaded into the carriage 30. The main portion of the drum 14 is typically made from clear plastic which easily be scratch or soiled. As a result, to better protect the drum 14 during loading and unloading, an end plate 200 is positioned on either end of the drum 14. The end plates 200 are formed from a material which is more rigid than the clear plastic and thus less susceptible to scratching or other damage.

Figure 2B:
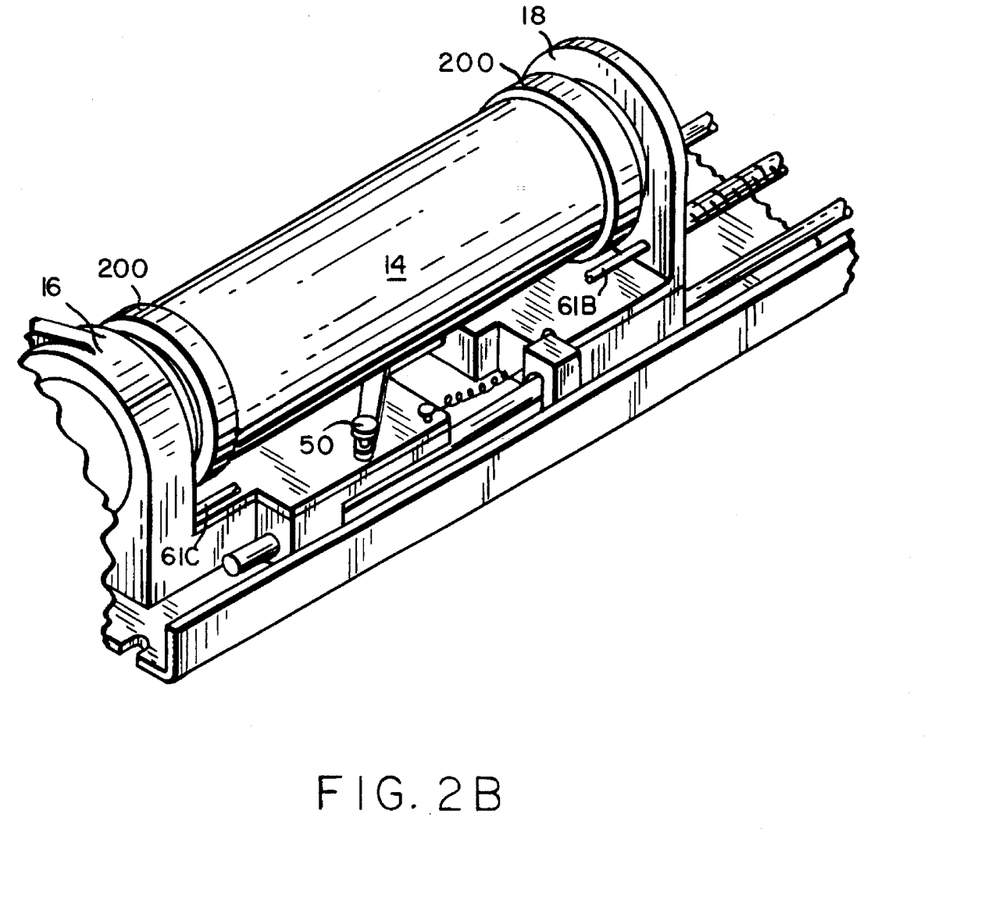
FIG. 2B is a view in perspective showing the drum in the process of being mounted or demounted from the carriage.

The length of the fingers 61 is chosen such that they extend inward beyond the inner ends of the plates 200, even when the carriage 30 is in the open position. Thus, when mounting a new drum 14, the operator places the drum 14 so that the only the end plates 200 rest on the fingers 61. The handle 58 is then operated to close the carriage 30 by moving the tail stock 18 towards the head stock 16. During this process, the end caps 200 of the drum 14 slide longitudinally along the fingers 61 while continuing to support the drum 14.

The fingers 61 also facilitate orderly removal of the drum 14 from the carriage 30. In particular, when the handle 58 is moved to separate the head and tail stocks 16 and 18, the drum 14 drops downwardly, due to the force of gravity, and lands on the fingers 61, where it is firmly supported. This eliminates the need for the operator to hold the drum 14 with one hand while operating the handle 58 with the other hand.

While the illustrated fingers 61 are round in cross-section, other convenient shapes and configurations of fingers 61 may be used. For example, there may be a single V-shaped finger mounted on each stock 16 and 18.

As shown in FIG. 2, when the drum is in its leftmost or "home" (also called "start") position, the leftmost end of the drum is brought to a position immediately adjacent the leftmost end of the base 40. In this position, the leftmost end of the scanner trips a switch 64 indicating that the carriage is in its "home" position; in this position, the leftmost end of reflective scanner arm 24 is within the area of the tail stock 18 and no scanning can occur. As the carriage 30 thereafter traverses the base 40 during a scan, the drum 14 moves along the arm 24 and enables scanning of a document until the drum reaches its "end" position at a location immediately adjacent the right end support 22. Thus, the width (i.e., along the longitudinal drum axis) of the scanner is slightly over twice the length of the drum.

Figure 3:
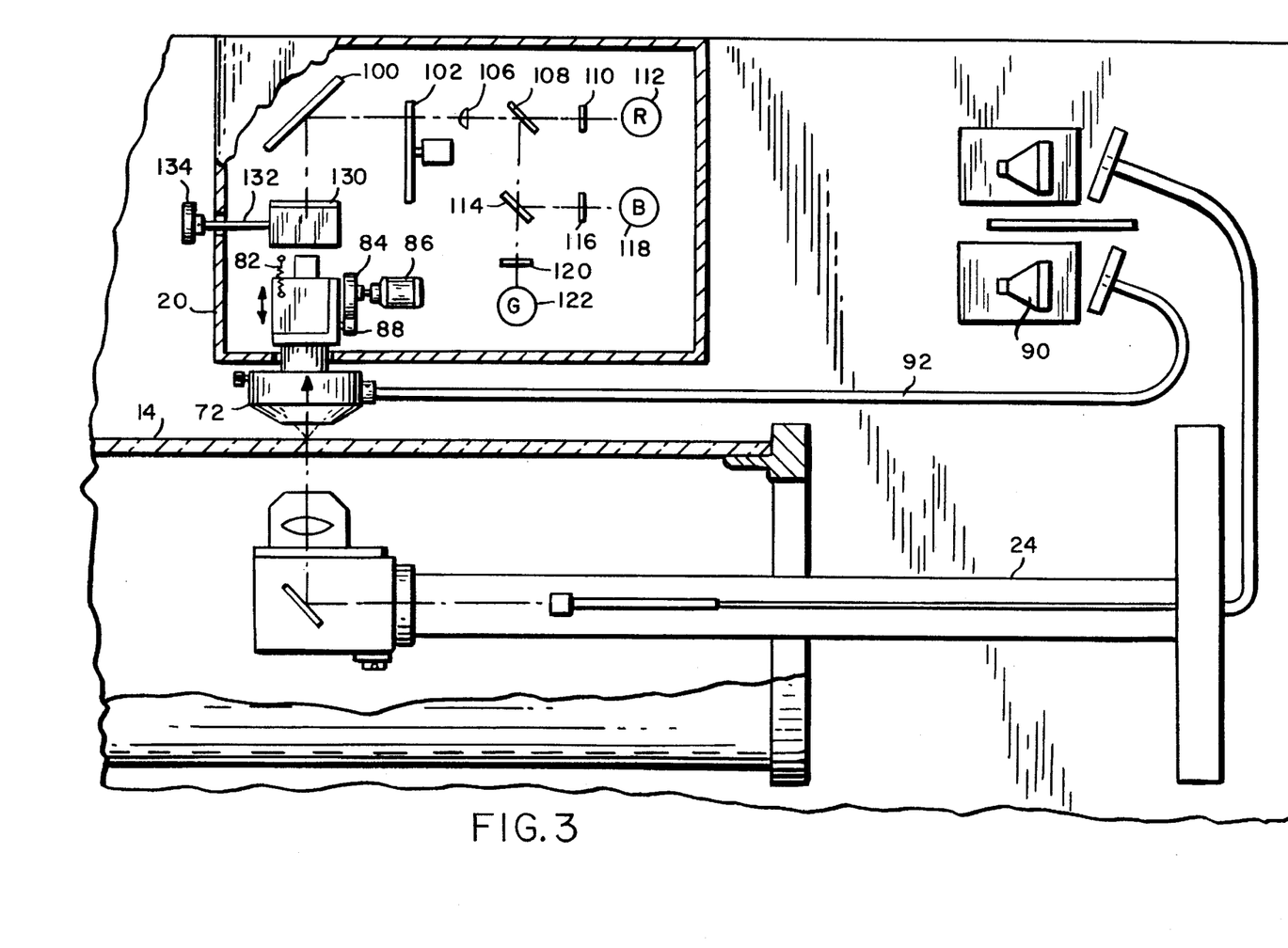
FIG. 3 is a top plan view of the optical scanning portion of the scanner of FIG. 1.
Figure 3A:
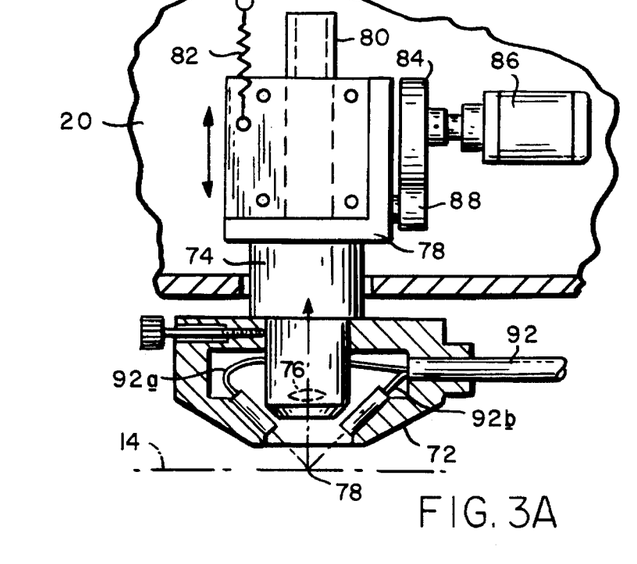
FIG. 3A is an enlarged top plan view of the analyzer lens assembly of FIG. 3, with portions broken away for purposes of explanation.

Turning now to FIG. 3, the optical imaging system of the scanner is shown in more detail. For purposes of illustration, the scanner is shown with the drum approximately midway between the "start" and "end" positions, and with a document 70 positioned on the drum for scanning. As noted previously, the scanner of the present invention includes both reflective and transmissive scanning components. The reflective component includes an illuminator ring 72 which is removably secured (e.g., by thumbscrew 73) over a lens housing 74 which has a lens 76 mounted therein. The lens housing 74 extends through an aperture 77 in the housing of optical subsystem 20.

The lens 76 is focused on a spot 78 at the surface of the drum 14 and is the principal image-forming lens for both transmissive and reflective scanning. In the preferred embodiment of the invention as described herein, lens 76 has a high numerical aperture (e.g., 0.3), a moderate magnification (e.g., 10×), and a short focal length (e.g., 14 mm). The lens is mounted on a carriage 77 which in turn is mounted for translational motion on a ball slide 80. A spring 82 extends between the carriage 77 and the bed 40 of the scanner and biases the carriage against a cam 84. The cam 84, which is driven from a motor 86, engages a cam follower 88 mounted on the carriage 78. When the motor 86 is energized, it moves the carriage, and thus the lens 76, to a desired position in order to focus the lens. The illuminator ring 72 moves with the lens so that the same spatial relationship between the lens and the illuminator ring is maintained regardless of the lens position.

Illuminator ring 72 carries light from a source 90 via a fiber optic cable 92. The cable enters the ring 72 as a unitary bundle, and thereafter splits into a number of segments 92a, 92b, etc. peripherally surrounding the lens 76 and angled inwardly and downwardly to project illuminating light converging on the spot 78. In the reflective scanning mode, in which a reflective document is positioned on the surface of the drum 14, light projected onto the document from the illuminator ring is reflected into the lens 76 and is thence passed to a mirror 100 from whence it is reflected to an aperture wheel 102. Wheel 102 is driven from a motor 104 and has a series of apertures forming field stops ranging from 62.5×62.5 microns (for 4000 dpi resolution) to 2500× 2500 microns (for 100 dpi resolution) formed around the periphery thereof; the field stops are selectively brought into the light path by appropriately energizing the motor 104. The field stops define the size of the image that is passed to the measuring system, and thus define the resolution of the image.

Light from the aperture wheel 102 is passed through a relay lens 106 to a first beam splitter in the form of a dichroic mirror 108 and thence through a filter 110 to a photomultiplier tube 112. The beam splitter 108 is so oriented with respect to the incident light that a portion of the light incident on it is reflected to a second beam splitter in the form of a dichroic mirror 114. Part of the light incident on beam splitter 114 is reflected to a filter 116 and thence is passed to a photomultiplier tube 118; the remainder is transmitted through beam splitter 114 to a filter 120 and thence to a photomultiplier tube 122.

Beam splitter 108 is formed to transmit the red spectral component of light incident on it, and to reflect the remaining components. Similarly, beam splitter 114 is formed to transmit the green component of light incident on and to reflect the remaining components. Thus, tubes 112, 118 and 122 are illuminated by the red, blue and green spectral components, respectively, of light transmitted from lens 82. The filters 110, 116 and 120 are bandpass filters for the colors red, blue and green, respectively.

A mirror 130 lies in the path of the light transmitted from analyzer lens 76 to mirror 100. The mirror 130 is mounted on a shaft 132 extending through the housing of optical subsystem 20; a knob 134 on the shaft external to the housing allows the mirror 130 to be manually rotated about the axis of the shaft. The mirror 130 is rotatable between two positions. In the first or "inactive" position, the mirror 130 is oriented generally horizontally, and its face lies outside the optical path between the analyzer lens 76 and the mirror 100. In the second or "active" position, the mirror 130 is rotated into the optical path between the lens 76 and the mirror 100 in order to divert a portion of the light incident on it to a viewing screen 136 (FIG. 1); the remainder is transmitted to the mirror 100. When the scanner is operated in automatic focusing mode, the mirror 130 is set to its "inactive" position. When the scanner is operated in manual focusing mode, the mirror 130 is set to its "active" position so that light from the analyzer lens is diverted into the viewing mechanism 136 to enable the operator to select a desired focus condition. The viewing mechanism 136 may be an eyepiece lens or may simply be a ground glass viewing screen.

Figure 3B:
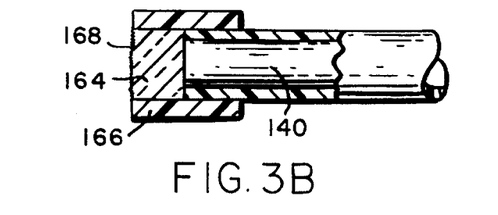
FIG. 3B is an enlarged side sectional view of the exit end of an illuminator cable as used in the present invention, showing a scrambler plate mounted thereon.
Figure 3C:
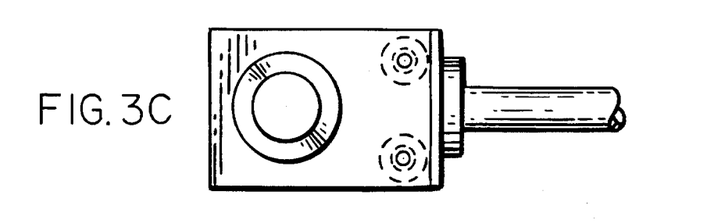
FIGS. 3C and 3D are top plan and side views of the transmission illuminator housing in accordance with the present invention.
Figure 3D:
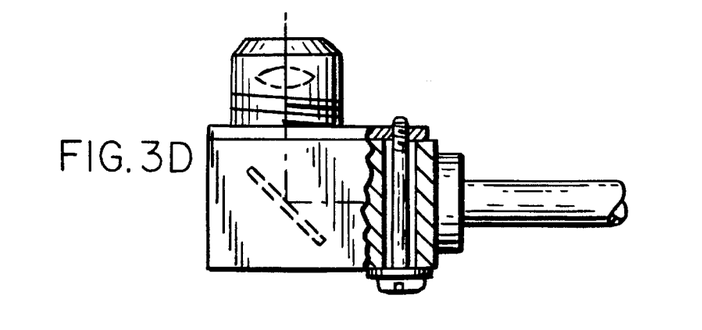

So far, we have described the reflective scanning portion of the system. The transmissive scanning portion includes a fiber optic cable 140 which receives light from an illumination source 142 and transmits it to a mirror 144. Mirror 144 is mounted in a housing 146 (see FIG. 3D) that is fitted into the end of the arm 24. The mirror reflects light from cable 140 to a lens 148 from which it is focused onto the spot 78. Lens 148 has a numeric aperture less than that of lens 76, e.g., 0.2, and a magnification of 7×. Accordingly, even if the optical axis of lens 148 does not precisely coincide with that of lens 76, the image formed by lens 148 will still be in the field of view of lens 7, and thus the amount of the transmissive illumination detected by lens 76 will be unaffected.

In order to ensure initial alignment within predefined limits, lens 148 is mounted in a housing 150 which threadedly engages a connector plate 152. Plate 152 is secured to housing 146 by screws 154, 156 (see FIG. 3C) having enlarged heads and extending through bores 158 in the housing 146. The bores are intentionally oversized, i.e., of diameter larger than that of the screws, so that the connector plate 152 may be translated and rotated by a defined amount with respect to the housing 146 before being fixed in place by tightening the screws 154, 156. This enables alignment of the optical axis of lens 148 with that of lens 76. Focusing of lens 148 is enabled by rotating the lens housing 150 in its threaded collar to thereby move the lens toward or away from focal spot 78 as necessary.

In order to ensure uniform illumination across focal spot 78, a light scrambler 160 (see FIG. 3B) is positioned over the end face of the fiber optic bundle. The scrambler 160 advantageously comprises a thin glass disk 164 of a diameter equal to the that of the fiber optic cable 140 and butted against it in a fitting 166 that securely holds the scrambler to the cable. The front face 168 of the scrambler is roughened by sandblasting, by acid etching, or the like to form a diffusing surface. Illuminating light passing through this surface is thus spread out in a more uniform spatial distribution.

Figure 4A:
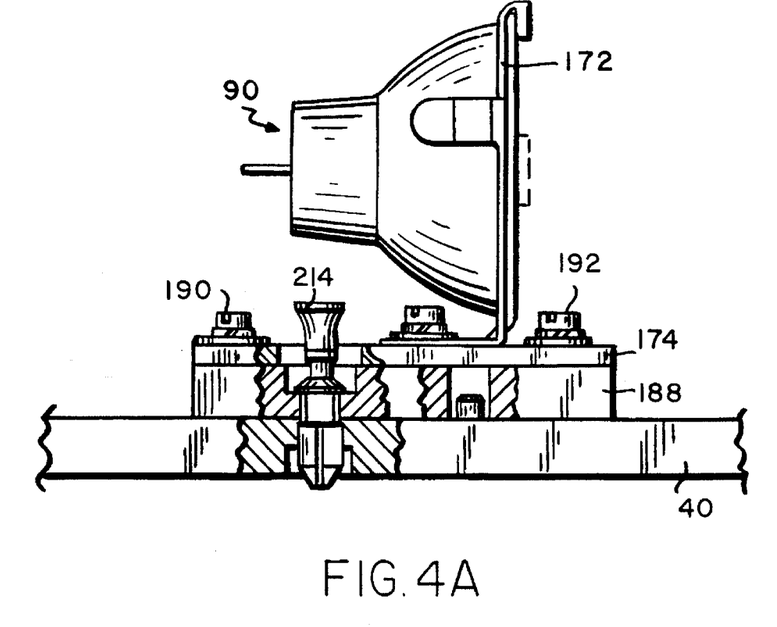
FIG. 4A is a side view, partly in section, of an illuminating assembly in accordance with the present invention.
Figure 4B:
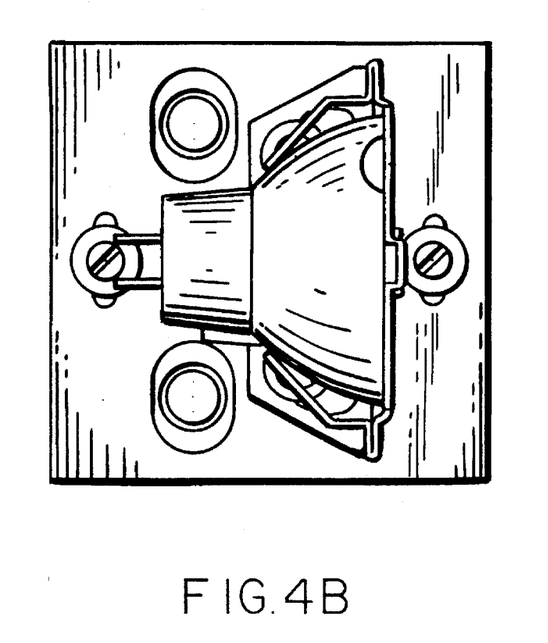
FIG. 4B is a top plan view of the illuminating assembly of FIG. 4A.

The manner in which the transmissive and reflective illuminating sources are formed is shown more particularly in FIGS. 4A and 4B. Because these sources are identical, for both transmissive and reflective illumination, only a single source, e.g., source 90, need be described in detail. The source comprises a lamp 170 mounted in an L-shaped bracket 172 secured to a mounting block 174 by screws 176, 178 (see FIG. 4B) which penetrate into mounting block 174 through alignment holes 180, 182. These holes are shaped to accommodate limited motion of the bracket with respect to the screws in both the longitudinal (e.g., left-to-right as seen in FIGS. 4A and 4B) and transverse directions. Washers 184, 186 secure the bracket 172 to the plate 174 when the desired position is attained.

Plate 174 is attached to a base 188 by screws 190, 192 which extend through elongated slots 194, 196 into the base. Washers 198, 200 span the slots and are pressed against the plate 174 as the screws 190, 192 are tightened to lock the plate to the base. Slots 194, 196 enable a limited longitudinal displacement of the plate 174 with respect to the base 188, and a somewhat greater transverse displacement.

Base 40 has a pair of locator pins extending upwardly from it, only one of these, pin 210, being shown in FIG. 4A. These pins are located near the respective sides of the block 188 and fit into corresponding slots 212 in the base 188 to thereby fix the orientation of the base 188 with respect to the base 40. The two bases are locked together by a pair of quick-connect locking pins 214, 216 which extend through holes, e.g., holes 218, 220, in the respective bases.

The construction of the illuminator sources as described above insures proper alignment of the sources with the entrance apertures of the fiber optic cables 92, 140. Referring to FIG. 3, the entrance apertures 230, 232 of the cables 92, 140 are held in fixtures 234, 236 fixed to the base 40. They are slanted at a slight angle (e.g., 10–15 degrees) to the transverse to the optical path between the light source and the entrance apertures of the cables. This ensures that the entrance apertures "see" not the central filament of the lamps, which may vary in intensity over the field of view of the aperture, but rather the reflective bowl of the lamp over which the illumination is more uniform.

The position of the illuminator sources with respect to the fixtures 234, 236 is fixed on manufacture of the scanner to insure optimum illumination transmission along the fiber optic cables. However, if an illuminator lamp is replaced, particularly by an untrained person, the proper alignment between the lamp and cables may be interrupted. In accordance with the present invention, however, the entire lamp module, including the lamp and its mounting base, can readily be replaced, even by an untrained user, without adversely affecting the alignment of the illuminator system. This is a significant advantage, since it enables use of lower cost lamps (e.g., tungsten filament lamps) which otherwise would not be desirable because of their short lifetime (e.g., on the order of 200 hours) without requiring the services of a trained technician for replacement when necessary. The critical alignment of the lamp within the assembly is, instead, performed at the factory on a standard test bed which has the same locator pin and fiber optic face plate positioning as all the scanners made in accordance with the invention.

Figures 5, 5A:
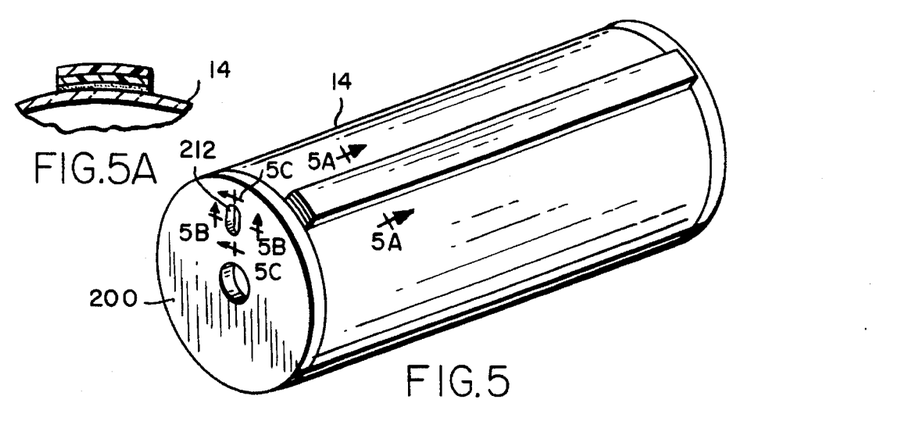
FIG. 5 is a view in perspective of a removable drum in accordance with the present invention.
FIG. 5A is a sectional view of the drum of FIG. 5 showing an scanner reference band in accordance with the present invention.
Figure 5B:
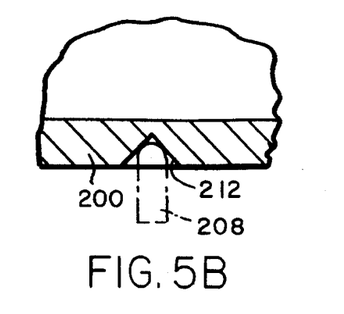
FIG. 5B is a side sectional view along the lines B—B of FIG. 5 showing the engagement of the driving pin with the drum.
Figure 5C:
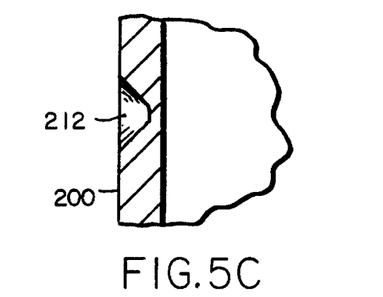
FIG. 5C is a sectional view of the left end of the drum taken along the lines C—C of the FIG. 5.
Figure 6:
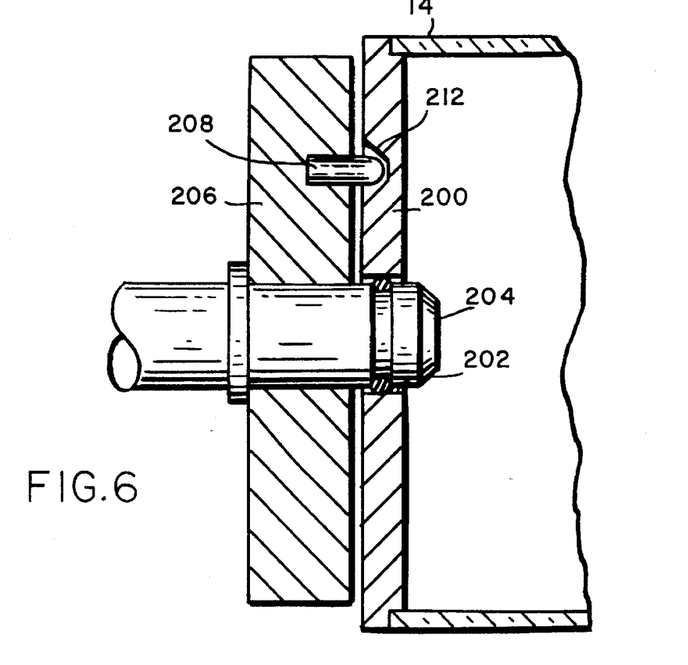
FIG. 6 is a sectional view of the left end of the drum of FIG. 5 showing the drive shaft in engagement with the drum.

A further feature of the invention is the provision of a drum drive that results in a highly stable, smooth interconnection of the drum to the drive source and that results in minimal jitter in the drum motion. Referring to FIGS. 5 and 6, the drum 14 of the scanner of the present invention has an end plate 200 through which a central hole 202 is formed. A drive shaft 204 carrying a drive plate 206 extends through the hole 202 and frictionally engages the drum 14 by means of an O-ring 207 held in a slot in the shaft. The O-ring is compressed when the shaft is fitted into the hole, to thereby provide a snug fit between the driving shaft and the drum.

Fixedly attached to drive plate 206 and extending outwardly therefrom is a pin 208 which engages a radially elongated drive slot 210 having inwardly V-shaped tapered walls 212. The pin has a rounded taper at its outer end and maintains a two-point contact with the walls 212 in the circumferential direction, while being free to move in the radial direction along the drum slot to accommodate any eccentricity in the drum or the drive. The pin is held against the slot by the springs 52, 54 of the carriage segments. The result is a relatively stable, "noise-free" drive which enables reliable scanning at resolutions up to several thousand dots per inch.

The pin 208 and tapered wall 212 also cooperate with the fingers 61 (see FIG. 2B) to facilitate exact positioning of the drum 14 while it is being loaded into the carriage 30. As explained previously, the drum 14 is first laid into the carriage 30 by resting the end plates 200 on the fingers 61. The drum 14 is then rotated by hand until a reference calibration strip, such as indicated by a small longitudinal line on the left hand end plate 200, is approximately aligned with another line scribed in the drive plate 206.

After roughly aligning the drum in this manner, the handle 58 is operated to close the carriage 30. As previously explained, during the process of closing the carriage 30, the pin 208 is inserted and aligned in the tapered walls 212 of the radially elongated drive slot 210; during this process, the drum 14 is held in the proper longitudinal position by the fingers 61.

The fingers 61 (FIG. 2B) also cooperate with the pin 208 and tapered wall 212 to facilitate exact positioning of the drum 14 while it is loaded into the carriage 30. As explained previously, the drum 14 is first laid into the carriage 30 by resting the end plates 200 on the fingers 61. The drum 14 is then rotated by hand until a longitudinal reference mark on the left hand end plate 200 of the drum 14 is approximately aligned with another reference mark scribed in the left hand drive plate.

After roughly aligning the drum in this manner, the handle 58 is operated to close the carriage 30. As previously explained, during the process of closing the carriage 30, the pin 208 is inserted and aligned in the tapered walls 212 of the radially elongated drive slot 210; during this process, the drum 14 is held in the proper longitudinal position by the fingers 61.

FIG. 5 also shows a reference band or strip used in the scanner to provide a high reflectivity "white" reference for reflective mode scanning, and a low reflectivity "black" reference for transmissive scanning. The band 220 comprises a first layer 222 of a highly reflective, "white" material such as a commercial base white material of the type commonly used in photographic work; an intermediate layer 224 of mylar having a full coat of solvent base black ink thereon; and a bottom layer 226 of an adhesive for securely fastening the strip to the drum. The strip has a transmittance density greater than 6.0, and a diffuse reflectance density of approximately 0.06, and thus provides high quality black and white scanning references.

In the reflective scanning mode, light from the illuminator ring 72 impinges on the upper strip 220 and a portion is reflected back into the analyzer lens 76. Thus, a controlled "white" reflectance level is established for the reflective scanning mode. In the transmissive scanning mode, light from the transmission illuminator lens 148 impinges on the inner strip 224 and is largely absorbed in the blackened surface of this layer, thereby establishing a controlled "black" level for transmissive scanning. These controlled reference levels help insure a scanner of high accuracy.

The scanner of the present invention also enables selection of either automatic or manual focusing, dependent on the source of the input drive pulses applied to focus control motor 86. For example, control pulses may be applied by the user from a master clock (not shown) through a manual switch under control of the user to move the carriage 77, and thus the lens 76, toward or away from as desired in order to change the focus. The switch may be located on the scanner itself, or may be remote therefrom. The latter is desirable in an integrated scanner and processing system in which a remote screen may be used for viewing the output of the photodetectors 112, 118, 122 and setting the focus accordingly. Alternatively, the requisite focus can be set automatically in response to the output of the photodetectors. For example, a focus control circuit responsive to the photodetector outputs varies the focal position of lens 76 to achieve optimum focus. This capability greatly enhances the utility of the scanner of the present invention.

CONCLUSION

From the foregoing it will be seen that we have provided an improved rotary scanner which provides rapid, high resolution, high dynamic range scanning of both reflective and transmissive documents. The scanner is of simple and efficient design, thus enabling the provision of high quality performance at a price heretofore characteristic of lower quality scanners. A stable, jitter-free drive enables high scanning resolution. A user-replaceable light source allows user maintenance of the most frequently failing part of scanners, and thereby further enhances the economy of the scanner. Provision is made for manual, remote, or automatic focusing, and a unique reference band establishes controlled calibration points for reflective and transmissive scanning.

It will be understood that the foregoing is to be taken as illustrative only, and not in a limiting sense, and that while we have described in detail a preferred embodiment of the invention, it will be understood by those skilled in the art that various changes may be made therein without departing from either the spirit or the scope of the invention.

We claim:

1. A rotary scanner for scanning both transmissive and reflective documents, comprising:
   A. means for releasably mounting a drum for motion along a drum axis and for rotation about said axis, said drum being transparent and adapted to receive a document on the exterior surface thereof for scanning,
   B. an analyzer lens mounted adjacent to, and on the exterior of, said drum for imaging an area of said document,
   C. a first means for illuminating said imaging area from the exterior of said drum for reflection imaging,
   D. a second means for illuminating said imaging area from the interior of said drum for transmission imaging,
   E. means mounting said analyzer lens for motion toward and away from said drum to enable focusing of said lens with respect to said image area.

2. A rotary scanner according to claim 1 in which said analyzer lens mounting means includes:
   (1) a carriage mounting said lens thereon,
   (2) means for driving said carriage from a motor,
   (3) means for selecting a source for motor drive signals from sources including user-generated signals and signals derived from one or more photodetectors receiving light from said document.

3. A rotary scanner according to claim 2 in which said user-generated signals include signals generated at a source remote from said scanner.

4. A rotary scanner according to claim 1 in which said first illuminating means comprises means surrounding said analyzer lens and mounted for movement therewith.

5. A rotary scanner according to claim 4 in which said first illuminating means comprises a ring removably secured to said analyzer lens and projecting light onto the focal spot of said lens.

6. A rotary scanner according to claim 1 in which said second illuminating means includes an illuminator lens for projecting light onto the focal spot of said analyzer lens through said drum.

7. A rotary scanner according to claim 6 which includes means mounting said illuminator lens for movement transverse to the optical axis of said analyzer lens.

8. A rotary scanner according to claim 7 which further includes means for moving said illuminator lens along the optical axis thereof to enable focusing of the illumination beam.

9. A rotary scanner according to claim 6 in which the numerical aperture of said illuminator lens is less than that of said analyzer lens whereby the focal spot of said illuminator lens remains within the field of view of said analyzer lens despite limited misalignment between the optical axes of said lenses.

10. A rotary scanner according to claim 1 which further includes a reference strip for providing white and dark references for scanning, said strip comprising:
    (1) an outer layer of a highly reflective commercial base white material,
    (2) an intermediate layer of a plastic material coated with a highly light-absorbent coating,
    (3) a layer of an adhesive for securely fastening the strip to the drum.

11. A rotary scanner according to claim 1 in which said second means for illuminating said imaging area includes a fiber optic cable having a scrambler placed over the end thereof.

12. A rotary scanner according to claim 11 in which said scrambler is a plate comprising a thin glass disk of a diameter equal to the that of the fiber optic cable and butted against it in a fitting that securely holds the scrambler to the cable.

13. A rotary scanner according to claim 12 in which the front face of said scrambler is roughened to form a diffusing surface which causes illuminating light passing through this surface to be spread out in a more uniform spatial distribution.

14. A rotary scanner for scanning both transmissive and reflective documents, comprising:
   A. means for releasably mounting a drum for motion along a drum axis and for rotation about said axis, said drum being transparent and adapted to receive a document on the exterior surface thereof for scanning, said drum mounting means comprising first and second separable carriage segments mounted for translation along a bed, said segments being releasably coupled to each other by spring means, and further including means for driving one of said segments along said drum axis,
   B. an analyzer lens mounted adjacent to, and on the exterior of, said drum for imaging an area of said document,
   C. a first means for illuminating said imaging area from the exterior of said drum,
   D. a second means for illuminating said imaging area from the interior of said drum, and
   E. means mounting said analyzer lens for motion toward and away from said drum to enable focusing of said lens with respect to said image area.

15. A rotary scanner according to claim 14 which includes a lever mounted on one of said carriage segments, said lever being movable to separate said segments to enable mounting or demounting of a drum thereon.

16. A rotary scanner according to claim 14 in which said drum includes a radially extending slot on an end face thereof and in which said drum mounting means includes a driving pin for engagement with said slot for rotating said drum.

17. A rotary scanner according to claim 16 in which said driving pin is mounted on a first of said carriage segments and is urged into said slot by said spring means.

18. A rotary scanner according to claim 16 in which said slot has inwardly sloping walls parallel to said radial direction.

19. A rotary scanner according to claim 18 in which said slot has V-shaped walls parallel to said radial direction.

20. A rotary scanner according to claim 18 in which said pin has a curved end face for essentially point contact with said walls.

21. A rotary scanner according to claim 18 in which said pin is mounted for substantially point contact with said walls at a leading and trailing face thereof.

22. A rotary scanner according to claim 16 in which said drum includes a centrally located hole in said end face and in which said drum mounting means includes a shaft for engagement with said hole through a resilient sealing ring.

23. A rotary scanner for scanning both transmissive and reflective documents, comprising:
   A. means for releasably mounting a drum for motion along a drum axis and for rotation about said axis, said drum being transparent and adapted to receive a document on the exterior surface thereof for scanning,
   B. an analyzer lens mounted adjacent to, and on the exterior of, said drum for imaging an area of said document,
   C. a first means for illuminating said imaging area from the exterior of said drum,
   D. a second means for illuminating said imaging area from the interior of said drum, said first and second illuminating means including first and second sources of illumination, respectively, each source of illumination comprising;
      (1) a high intensity lamp, and
      (2) means mounting said lamp on a base, said base having a pair of locator elements therein for mating with a corresponding pair of locator elements on a base of said scanner, and in which said scanner base includes means for mounting illumination transmission elements in fixed relation to each said base, said lamp and said lamp base being replaceable as a unit to ensure alignment of said lamp with said transmission element, and
   E. means mounting said analyzer lens for motion toward and away from said drum to enable focusing of said lens with respect to said image area.

24. A rotary scanner for both transmissive and reflective documents, comprising:
   A. a drum mounted on a carriage for translation along a drum axis,
   B. a cantilevered arm extending along said drum axis and having a transmittance illuminating source mounted at a free end thereof for illuminating a selected portion of the surface of the drum through said drum,
   C. an analyzer lens mounted adjacent the drum and on the exterior thereof for analyzing said selected portion,
   D. means for positioning a field stop of selectable size in the image plane of said analyzer lens,
   E. a plurality of photodetectors for selectively receiving light transmitted through said field stop by said lens.

25. A rotary scanner according to claim 24 in which said field stop positioning means comprises indexing means having a plurality of stops thereon, said indexing means being indexable to select a desired field stop.

26. A rotary scanner according to claim 25 which includes a relay lens for transmitting the aperture image to said photodetectors at substantially constant size.

27. A rotary scanner according to claim 24 which includes a light source for providing pre-aligned and pre-focused illumination to said document, said light source comprising:
   (a) a base for mounting on said scanner, said base having a plurality of locator elements for precisely fixing the position of said base with respect to said scanner, and at least one releasable connector for releasably securing said base to said scanner,
   (b) a bracket extending from said base for mounting a lamp thereon, said bracket being translatable and rotatable with respect to said base in directions parallel to said base.

28. A rotary scanner according to claim 27 which includes means defining an aperture in said bracket and a plurality of fingers surrounding said aperture for holding said lamp in a position facing said aperture for transmission of light therethrough.

29. A rotary scanner according to claim 27 which includes at least first and second of said light sources mounted side by side and providing illumination scanning a document in reflective and transmissive mode, respectively.

30. A rotary scanner according to claim 24 in which said transmittance illuminating source includes a lens imaging an illuminating beam onto the exterior surface of said drum, and means for adjusting the focal position of said beam on said drum.

31. A rotary scanner according to claim 24 including means mounting said analyzer lens for motion along the optical path thereof, and means for setting the position of said lens along said path in response to the output of said photodetectors when operating in a focusing mode.

32. A rotary scanner according to claim 31 in which said position setting means comprises a motor for moving said lens and a controller energizing said motor to drive said lens to a position corresponding to the maximum rate of change of said detector outputs.

33. A rotary scanner according to claim 24 in which said carriage includes first and second carriage segments movably mounted on said base and connected for simultaneous translation therealong to effectuate line-by-line scanning of a document.

34. A rotary scanner according to claim 33 including an arm mounted on one of said carriage segments and rotatable to force said carriage segments apart, and a spring interconnecting said carriages and biasing said carriages toward each other.

35. A rotary scanner for both transmissive and reflective documents, comprising:

A. a drum mounted on a carriage for translation along a drum axis,

B. means for illuminating a focal area on said drum from both the interior and the exterior of said drum, C. an analyzer lens mounted adjacent the drum and on the exterior thereof for analyzing said selected portion, D. means for positioning a field stop in the image plane of said analyzer lens, the field stop being selected from a plurality of field stops, and E. a plurality of photomultuplier tubes for selectively receiving light transmitted through said filed stop by said lens.

36. A rotary scanner according to claim 35 including a relay lens adjacent said field stop and transmitting to said tubes an image of relatively constant size from said analyzer lens despite the size of said aperture.

37. A rotary scanner according to claim 35 in which the ratio of said field stop areas is selectable over a range of up to 1600:1.

38. A rotary document scanner for scanning documents, comprising:

A. a drum being adapted to receive a document on the exterior surface thereof for scanning;

B. means for releasably mounting the drum for motion along a drum axis and for rotation about said axis, comprising first and second separable carriage segments mounted for translation along a bed, said segments being releasably coupled to one another by spring means, and further including means for driving one of the segments along said drum axis; and C. one or more holding fingers, having an axis in parallel with the drum axis, at least one finger positioned on each of the carriage segments, such that the fingers contact the peripheral ends of the drum while the drum is being loaded into position between the carriage segments.

39. A rotary document scanner according to claim 38 wherein each carriage includes two holding fingers.

40. A rotary document scanner according to claim 38 in which said drum comprises also includes end plates mounted on the outer ends of said drum, and in which the lengths of the fingers are chosen to extend inward beyond the innermost dimension of the end plate.

41. A rotary document scanner according to claim 38 in which said end plates also contain a radially-extending V-shaped slot for substantial point-contact engagement with a driving pin for applying force to said drum.

42. A rotary document scanner according to claim 38 in which the holding fingers are positioned far enough below the drum to clear the outer diameter of the drum while the drum is mounted on the carriage.

\* \* \* \* \*